United States Patent [19]

Babbin et al.

[11] Patent Number: 4,512,942
[45] Date of Patent: Apr. 23, 1985

[54] METHOD AND APPARATUS FOR VULCANIZING HOSE

[75] Inventors: William R. Babbin, Barberton; James W. Messerly, Stow, both of Ohio

[73] Assignee: B. F. Goodrich Company, New York, N.Y.

[21] Appl. No.: 503,937

[22] Filed: Jun. 13, 1983

[51] Int. Cl.³ .............................................. B29H 5/01
[52] U.S. Cl. .................................... 264/26; 264/209.6; 264/347; 264/DIG. 46; 425/28 B; 425/174.4; 425/174.8 R; 425/371
[58] Field of Search .................. 264/25, 26, DIG. 46, 264/347, 209.6; 425/174.4, 174.8 R, 445, 28 B, 371

[56] References Cited

U.S. PATENT DOCUMENTS

| | | | |
|---|---|---|---|
| 2,739,351 | 3/1956 | Henning | 264/26 |
| 3,420,923 | 1/1969 | Ashworth et al. | 264/26 |
| 3,471,352 | 10/1969 | Brooke et al. | 264/25 |
| 3,482,004 | 12/1969 | Anderson | 264/25 |
| 3,519,517 | 7/1970 | Dench | 264/26 |
| 3,732,048 | 5/1973 | Guerga et al. | 425/174.4 |
| 4,011,197 | 3/1977 | Lee | 264/26 |
| 4,104,098 | 8/1978 | Hush et al. | 264/209.6 |
| 4,112,031 | 9/1978 | Gohlisch | 264/347 |
| 4,198,554 | 4/1980 | Wayne | 264/26 |
| 4,233,013 | 11/1980 | Böhm et al. | 425/174.4 |
| 4,269,581 | 5/1981 | Ury et al. | 425/174.4 |
| 4,323,745 | 4/1982 | Berggren | 264/26 |

FOREIGN PATENT DOCUMENTS

| | | | |
|---|---|---|---|
| 51-75772 | 6/1976 | Japan | 264/25 |
| 51-21666 | 7/1976 | Japan | 264/25 |
| 58-24430 | 2/1983 | Japan | 264/25 |

Primary Examiner—Jeffery Thurlow
Attorney, Agent, or Firm—Joseph Januszkiewicz

[57] ABSTRACT

The vulcanizing of elastomeric articles by captively securing the article to be cured under pressure by a mold that is transparent to microwave energy. The mold in the preferred embodiment is a pair of conveying runs which define cooperatively a mold cavity therebetween. The microwave transmitting devices are located along the path of movement of such conveying runs.

6 Claims, 5 Drawing Figures

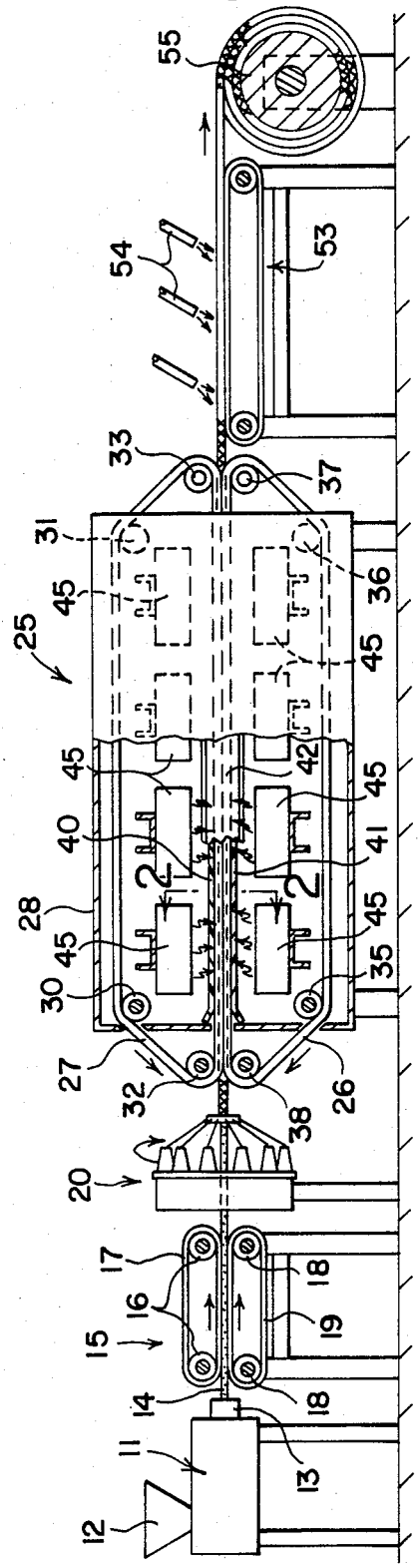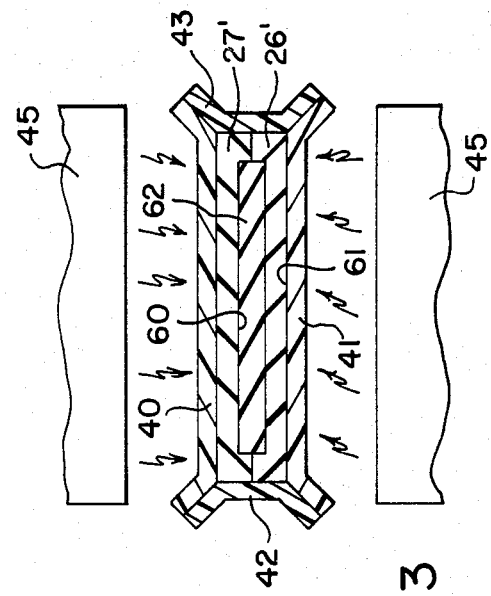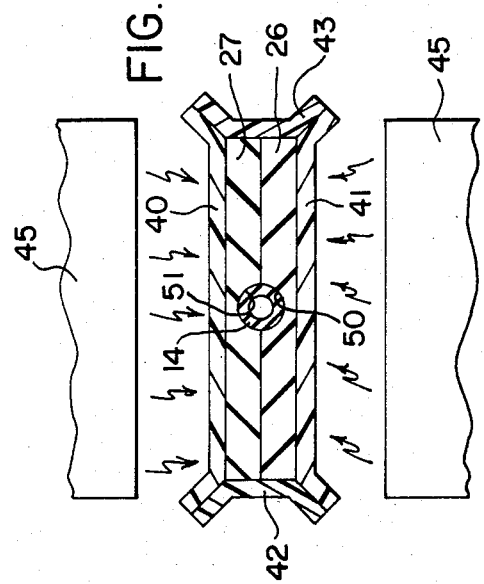

4,512,942

METHOD AND APPARATUS FOR VULCANIZING HOSE

BACKGROUND OF THE INVENTION

The invention relates to the vulcanization of elastomeric hose utilizing microwave energy in a continuous process.

There are various method and techniques employed in the manufacture of elastomeric hose which includes forming an unvulcanized elastomeric hose structure around a flexible or rigid mandrel, encasing the hose and mandrel and thence vulcanizing the hose by molding a sheath such as a lead sheath around the hose and thence vulcanizing the hose. In this instance the lead must be removed by stripping the outer lead sheath and thence removing the internal mandrel from the vulcanized hose. This method maintains a pressure on the hose while being vulcanized. Modifications on this technique which eliminates the lead sheath is a continuous type process wherein the uncured hose is passed into a vulcanizing fluid chamber (heated fluids) where the hose is wrapped around a moving spool and slowly withdrawn from the chamber. Another method passes the hose through a tubular chamber by means of hot vulcanizing fluid. In the latter case, higher pressures are required on the curing fluids as well as the transporting fluids. Additional safety problems are encountered when using hot vulcanizing pressurized fluids. The use of the lead sheaths is cumbersome, requiring expensive equipment for handling and impedes rapid production. Considerable quantities of lead is required for this process with an ever present waste problem whereat in such a process. The present invention utilizes a microwave curing tunnel mold that maintains pressure on the hose or curing product which tunnel moved is transparent to the microwave energy thereby increasing the efficiency of the curing unit while enhancing the consistency of the finished product. Such method and apparatus eliminates the need for high temperature pressurized fluids and the costly use of the equipment and materials for the lead sheath process.

SUMMARY OF THE INVENTION

The present invention contemplates an apparatus and process for curing an elastomeric article in a mold that is transparent to the microwave energy that effects the cure thereof as the article is conveyed through a tunnel on an endless conveyor that is also transparent to the microwave energy. The devices for transmitting the microwave energy are located in the tunnel on either side of the path of movement of the article and mold in the conveying run of the conveyor belt.

BRIEF DESCRIPTION OF THE DRAWINGS

FIG. 1 is a diagrammic side elevational view of an apparatus showing a production line for manufacturing a reinforced hose in accordance with the present invention.

FIG. 2 is a cross-sectional view taken along line 2—2 of FIG. 1 of the conveyor belt mold and guides showing the microwave transmitters relative thereto.

FIG. 3 is a cross-sectional view of a modified form of conveyor belt mold showing a belt being captively secured thereby as the belt is being subjected to microwave energy for curing.

DESCRIPTION OF PREFERRED EMBODIMENT

Figure 4:
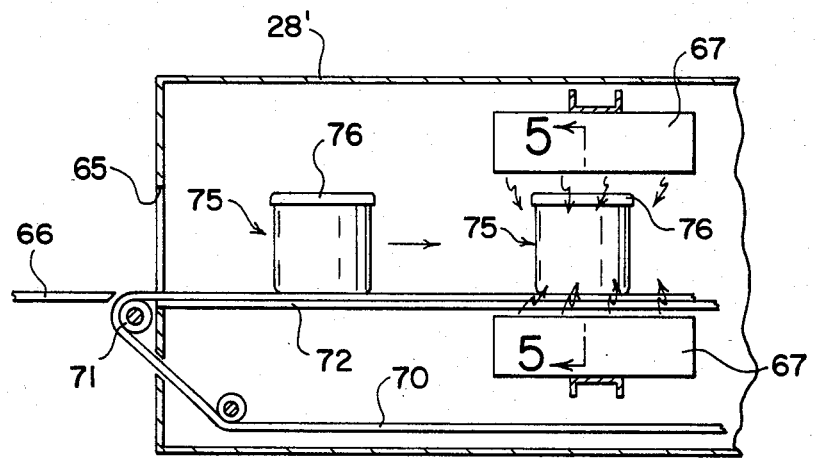
FIG. 4 is a further modification of the invention showing a side elevational view of the conveying run transporting a mold which is subjected to opposing microwave transmitting device.

Referring to the drawings, wherein like reference numerals designate like or corresponding parts throughout the several views, there is shown in FIG. 1 a continuous screw type extruder 11 having a hopper 12 which provides the means for introducing a suitable mixed blend into the extruder 11 for extrusion through a die 13 a tubular hose 14. Although not shown the hose may be cooled by passing such hose 14 through a cooling apparatus and thence such hose is drawn forwardly by a caterpillar type pulling apparatus 15 having a pair of upper roller 16 along with an endless belt 17 cooperative with a pair of rollers 18 along with an endless belt 19. The tubular hose 14 then passes to a cord winding machine 20 which winds a layer of textile thread onto the hose. Although only one winding machine 20 is shown, it is contemplated to have at least two winding machines which wind two layers of textile thread in opposite directions onto the tubular hose 14. The covered hose is then drawn into the vulcanizing unit 25 by a pair of endless belt molds 26 and 27. The unit 25 includes a housing 28 suitably supported and mounted in line with the cord winding machine 20. The respective ends of such housing 28 has openings to permit the movement of the endless belt therethrough along a pass line that is in alignment with the axial centerline of winding machine 20. Endless belt mold 27 extends along the upper portion of housing 28 between rollers 30 and 31 and on leaving such housing is directed downwardly and around idler roller 32 and thence directed horizontally along the pass line to a roller 33. The conveyor belt mold 27 is trained about roller 33 and then upwardly around roller 31. Endless belt mold 26 extends along the lower portion of housing 28 between rollers 35 and 36 and is thence directed upwardly and rearwardly over roller 37, and thence horizontally along the pass line and in contact with belt 27 to roller 38 at the forward portion of the housing. Belt 26 is trained over rollers 38 and thence downwardly under roller 35. Although only four rollers are shown for the respective belt molds 26 and 27, sufficient rollers are provided to maintain the endless belts in their path of movement. The respective belts 26 and 27 as seen in FIG. 2 are grooved at 50 and 51 respectively along their outer central periphery such that on coming together such grooves define a cylindrical bore for the full length of the pass line. As the endless belt molds 26 and 27 come together at the forward portion of housing 25, such belts captively engage the linearly moving hose 14 and move together at the same horizontal speed. As the belts 26 and 27 move through housing 25, they are guided by four spaced guide plates 40-41-42 and 43 suitably supported withing housing 25. Plates 40 and 41 are disposed opposite each other in vertical alignment while plates 42 and 43 are disposed opposite each other and are cooperative with plates 40 and 41 ato define a rectangular passageway therebetween which functions as a guide means to apply pressure onto the belt molds 26 and 27 which in turn transfer the pressure to the hose 14 located within grooves 40 and 41. The guide plates 40 through 43 are constructed from a material such as Teflon which is transparent to microwave energy for a purpose to be described. Such guide plates extend through the entire length of the housing 25. A plurality of vertically spaced pairs of UHF apparatus 45 are mounted within housing 25 in longitudinally spaced relationship along the pass line of grooves 50 and 51. The UHF apparatus are devices which provide electromagnetic waves to effect vulcanization of the hose 14 within grooves 50 and 51 of belts 26 and 27. The microwave energy and power is generated by means old and well known in the art. Such UHF apparatus include an emitter to facilitate the directing of the microwave energy. Such microwave energy devices or generators are available from Cober Electronics, Inc. Stamford, Conn. Microwave is defined as very short electromagnetic wavelengths in the order of 60 centimeters or less and frequencies in excess of 300 MHZ. 2450 MHZ and 915 MHZ are the frequency bands used in industrial applications. As seen in FIGS. 1 and 2 the electromagnetic waves are directed from the upper units 45 and the lower unit 45 directly towards the center line of hose 14. Since the guide plates 40-41-42 and 43 are constructed of Teflon which are transparent to microwave energy and the belts 26 and 27 are constructed of flexible silicone, which is also transparent to the microwave energy, the microwave energy passes directly to the heating and vulcanizing the hose 14, which hose is captively retained in the silicone mold of grooves 50 and 51 in belts 26 and 27 which applies the pressure during this curing process. The number of UHF apparatus 45 located within the tunnel of housing 25 is dependent on size of the product to be cured and the length of the tunnel. The curing can be controlled by utilizing only a given number of such UHF apparatus 45 within the tunnel of housing 25. In addition, the speed of the movement of the belts 26 and 27 can be electronically controlled for a preselected speed.

In the operation of the described apparatus, suitable raw material such as elastomeric material of suitable receptivity and physical properties is fed into the hopper 12 wherein such preblended mix is extruded from the die 13 of the extruder 11 as a hose which may be cooled by suitable means old and well known in the art. The hose 14 is then fed via the caterpillar type conveying apparatus 15 to a braiding machine 20 wherein suitable yarn is applied or wound onto the hose 14. Although a single braider unit is shown, additional units may be located in line with the braider unit 20 to provide the necessary reinforcement of yarn onto such hose 14. The reinforced hose is then fed into the nip of converging conveyor belt molds 26 and 27 such as to position the unvulcanized hose 14 within the grooves 50 and 51 of such belts. As the conveyor belt molds 26 and 27 enters the housing 25, the guide plates 40-41-42 and 43 exert a pressure onto the belt molds while the microwave emitters of UHF apparatus 45 heat the hose 14 to effect vulcanization. Since the belt guide plates and the conveyor belt molds 26 and 27 are transparent to the microwave energy the vulcanization process is highly efficient. The energy requirement to effect vulcanization is low since the energy is directed to the hose 14, which on heating up retains its level of energy within the belt mold due to the insulating properties of the silicone mold. The microwave energy penetrates the silicone belt molds with ease and an insignificant amount of energy is lost to the mold as the major portion of the microwave energy is used in heating up the hose within the mold.

As the belt molds 26 and 27 exit from the housing 25, belts 26 and 27 separate, allowing the hose 14 to move rectilinearly onto conveyor 53 where such hose 14 is cooled by a plurality of air jets 54. The hose is then wound up onto a spool 55 as the endless belt molds 26 and 27 continue in their endless path.

A modification of the described embodiment is shown in FIG. 3 wherein such endless conveyor belt mold 26' and 27' has a rectangular groove 60 and 61 to receive an unvulcanized conveyor belt 62, which in turn is vulcanized in the same manner as the previously described embodiment within the tunnel of housing 25.

Figure 5:
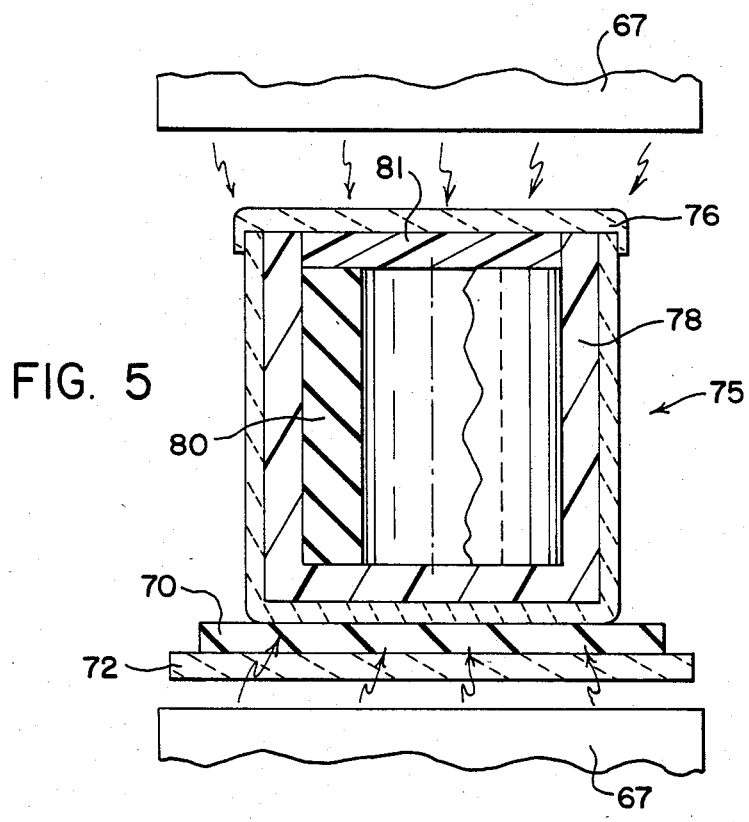
FIG. 5 is an enlarged view partly in section of a mold taken along line 5—5 of FIG. 4.

A further modification is shown in FIGS. 4 and 5 wherein the previously described housing 28 is replaced by a similar elongated housing 28' that has a central opening 65 in line with a platform 66 shown schematically in FIG. 4. Since platform 66 facilitates the loading of individual mold into the housing 28' which has a plurality of horizontally spaced UHF apparatus 67 located therein in the same manner as UHF apparatus 45 described above. An endless conveyor 70 is suitably trained within such housing 28 such that its return run is along the bottom of such housing while its conveying run is in line with the platform 66 and roller 71. As described above, endless conveyor 70 is made of silicone or nylon to assure the passage of the microwave energy through it without absorbing energy therefrom. A suitable horizontally disposed guide plate 72, made of ceramic, supports the conveying sum of endless conveyor 70 while also being transparent to microwave energy. A mold 75 that is fed to the conveyor 70 is a generally cylindrically shaped container with a lid 76 (also ceramic) suitably locked thereon. The mold 75 has a cylindrical inner liner 78 that is cup shaped such that a product to be cured, such as a rubber cylinder 80 is securely held by such inner liner 78 to apply and maintain a pressure thereon. A cap or disc 81 is placed onto the cylinder 80 prior to the placement of lid 76. The liner and cap 81 is placed onto the cylinder 80 prior to the placement of lid 76. The liner and cap 81 is also made from a material such as ceramic, nylon, fused quartz or silicone such as to be transparent to the microwave energy. As in the first described embodiment, the linear movement of the conveyor, conveys the rubber product 80 to be vulcanized past the microwave heaters 67 as the product is maintained under pressure to effect vulcanization thereof.

It will be apparent that, although a specific embodiment and certain modifications of the inventions have been described in detail, the invention is not limited to the specifically illustrated and described constructions since inventions may be made without departing from the principles of the invention.

We claim:

1. A process for vulcanizing a continuous length of reinforced rubber hose which comprises the steps of advancing a continuous length of hose to a pair of endless moving belt molds that are cooperative on merging to encompass such hose and with said belt molds being made of material transparent to microwave energy, advancing said hose while captively held by said moving belt molds between pressure applying guides that are transparent to microwave energy, applying pressure to said hose through the cooperative action of said guides applying pressure on said belt molds, exposing said encompassed hose to microwave energy to effect vulcanization of said hose, advancing said belt molds out of contact with said guides to remove pressure on said hose, and parting said moving belt molds from said hose while directing said vulcanized hose therefrom for windup.

2. A process for vulcanizing a continuous length of flat conveyor belting having an elastomer therein, said process includes the steps of advancing a continuous length of uncured belting to a chamber, captively securing said flat belting between a pair of merging conveying runs of a pair of endless belt mold conveyors that encompass said flat conveyor belting wherein said endless belt conveyors are made of material transparent to microwave energy, exerting a confining pressure to said flat belting from said pair of endless mold conveyors that are subject to pressures from guide means that are transparent to microwave energy, subjecting said confined flat belting to microwave energy to effect vulcanization thereof, and thence separating said belting from said pair of endless belt conveyors for subsequent windup.

3. A process for vulcanizing an uncured elastomer by feeding a continuous length of said elastomer to a chamber that has a longitudinal pass line therethrough, feeding said elastomer through said chamber along said pass line, exerting a confining and shaping pressure onto said elastomer along said entire pass line by a pair of confining conveyor belts subjected to a confining pressure from guide means that are transparent to microwave energy, and directing microwave energy onto said elastomer as confined by said conveyor belts and guide means to effect vulcanization of said elastomer.

4. An apparatus for vulcanizing elastomeric articles comprising, an elongated chamber, said chamber having an entrance end and an exit end, a pair of endless conveyor belts having a pair of merging conveying runs operative in said chamber for movement along a longitudinally extending pass line, said conveyor belts being transparent to microwave energy, microwave energy transmitting devices mounted in said chamber on opposite sides of said pass line, each of said conveyor belts having a continuous recess which is operative to receive an elastomeric uncured article at said entrance end to confine said elastomeric article as said article moves through said chamber drive means connected to said belts for moving said conveyor belts in their endless path, (and) means for energizing said microwave devices to transmit microwave energy towards said conveying runs to effect vulcanization of elastomeric articles confined in said recesses as it moves through said chamber, and said chamber has guide means therein operative to exert pressure on said pair of merging conveying runs along said pass line to maintain pressure on said elastomeric article confined therein during vulcanization thereof.

5. An apparatus for vulcanizing as set forth in claim 4 wherein said recess is a continuous semi-circular recess in each conveyor belt that are cooperative during the conveying runs of said belts to define a single continuous bore for receiving a hose for vulcanization therein.

6. An apparatus for vulcanization as set forth in claim 4 wherein said recess is a continuous rectangular recess in each belt for receiving a portion of a flat conveyor belt.

* * * * *